Dec. 28, 1965 G. E. WISE 3,225,805
SECTIONAL HANDBAG
Original Filed June 28, 1960
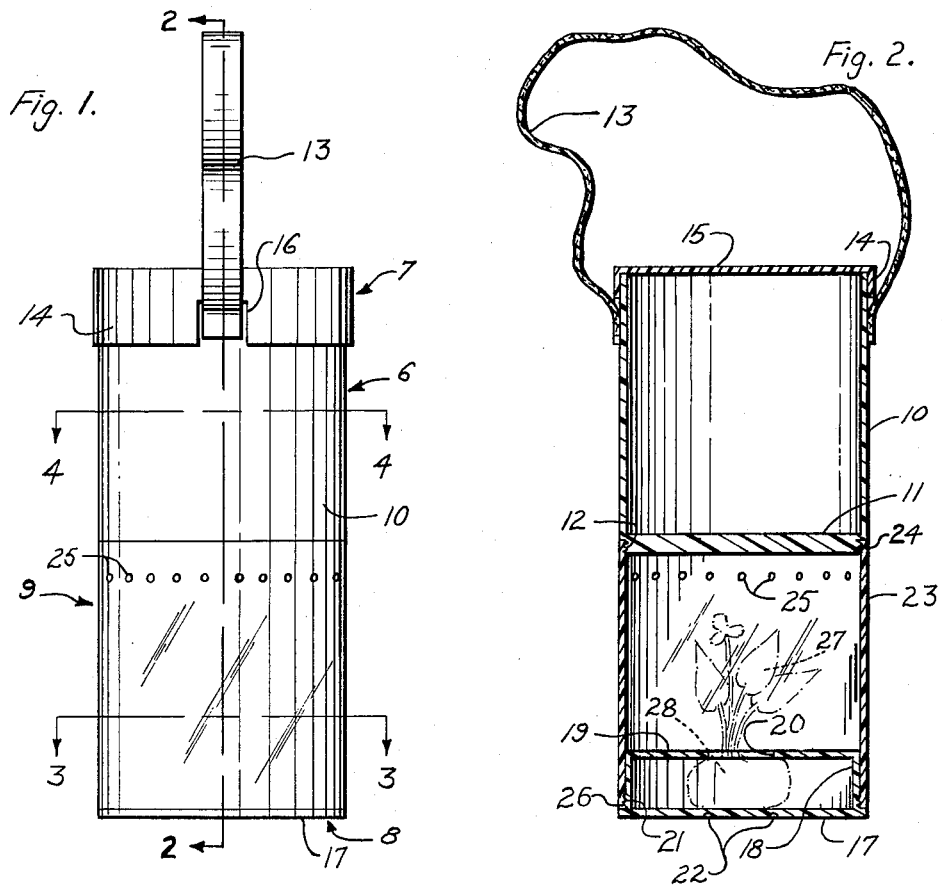
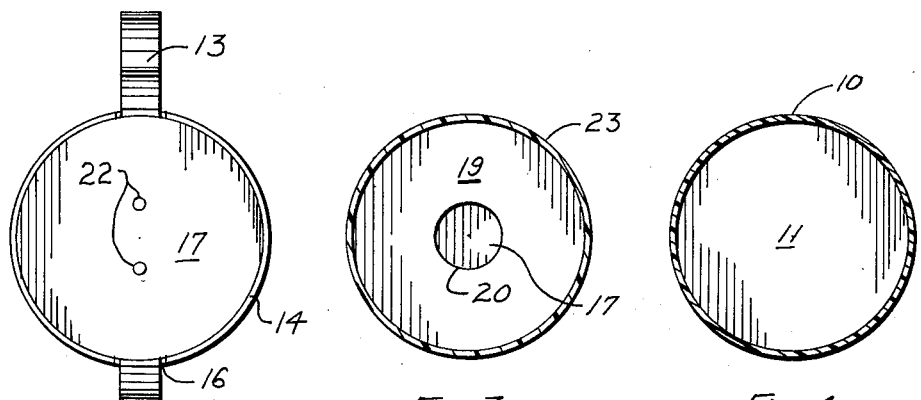
Fig. 5.   Fig. 3.   Fig. 4.
Glenn E. Wise
INVENTOR

United States Patent Office 3,225,805
Patented Dec. 28, 1965

3,225,805
SECTIONAL HANDBAG
Glenn E. Wise, 2415 39th Place NW.,
Washington 7, D.C.
Continuation of abandoned application Ser. No. 39,357,
June 28, 1960. This application Oct. 9, 1963, Ser. No.
315,742
4 Claims. (Cl. 150—35)

This invention relates to a handbag of the type carried as a female accessory, and more particularly to a handbag composed of plural sections wherein the usual cosmetic carrying container is combined with a plant or flower containing section. This application is a continuation of application Serial Number 39,357, filed June 28, 1960, but now abandoned.

The recent style trend in women's handbags has been toward ever larger receptacles of this nature. It is one object of my invention to take advantage of this trend by providing a handbag composed of a cosmetic carrying section and a plant or flower carrying section. The cosmetic carrying section is to be used in the usual manner, that is, as a receptacle for cosmetics, comb, change, etc., and removably appended to the cosmetic section is a second section for containing and carrying a live or artificial plant or floral display. Due to the removable nature of the second section, it may be used separately, somewhat in the nature of a flower pot or vase, as a holder for live or artificial plants or floral displays, or it may be appended to the cosmetic section, as previously mentioned, to provide a decorative and artistic touch to the entire combination, and, in cooperation with said cosmetic carrying section, it functions as a protective housing for transporting plants, bouquets, corsages, or the like.

Another object of my invention is to provide a sectional handbag wherein the sections may be disassembled with ease for separate use, or connected for concurrent, cooperative use.

Still other objects will be apparent from the balance of the specification and from the drawings.

In the drawings which form a part of this application:
FIG. 1 is a front elevation of my invention;
FIG. 2 is a sectional view taken on the line 2—2 of FIGURE 1, and showing in phantom lines how a plant would be related to the remainder of the structure;
FIG. 3 is a sectional view taken on the lines 3—3 of FIGURE 1;
FIG. 4 is a sectional view taken on line 4—4 of FIGURE 1; and
FIG. 5 is a bottom view of my invention.

Referring now to FIGURES 1 to 5 by reference numerals, my sectional handbag is composed of a cosmetic carrying section which includes a cosmetic carrying portion designated generally by 6 and a lid designated generally by 7, and a plant or flower carrying section which includes a base designated generally by 8 and a connecting portion desigated generally by 9.

The cosmetic carrying portion 6 is composed of a tubular portion 10 integrally joined at its bottom to a thickened bottom portion 11 thereby forming a container or receptacle with an open top. The outer, lower edge of bottom 11 is cut back to form a threaded wall 12 thereon, as seen in FIGURE 2. The purpose of this wall will be set forth later. Attached near the top of the cosmetic carrying portion 6, as by glue or other equivalent means, is a carrying strap 13, by means of which a user may transport all or part of my invention from place to place.

The lid 7 includes a tubular portion 14, the inside diameter of which is slightly greater than the outside diameter of tubular portion 10 so that portion 14 can be telescoped down around the outside of portion 10. Lid 7 also includes a top 15 which is integral with the top of portion 14, and cut-outs 16 which form notches in which the ends of strap 13 fit when the lid is closing the cosmetic carrying portion 6 as seen in FIGURE 1.

The base 8 is composed of a bottom plate 17 which carries an integral upstanding tubular portion 18 thereabove. Extending laterally inwardly at the top of portion 18 is an integral flange 19. The flange 19, as can be seen in FIGURES 2 and 3, forms an opening 20, which opening provides the only entry to the interior of base 8. Formed on the lower outside edge of portion 18 are threads 21 for a purpose to be described later, and cut into the underside of bottom plate 17 are finger-tip entry recesses 22, also to be described later.

The numeral 9 as mentioned previously, indicates generally a connecting portion. This connecting portion is composed of a tubular portion 23 having formed on the top inside edge thereof threads 24 which are designed to mate with the threads 12 on the bottom portion 11, and having formed on the lower inside edge thereof threads 26 which are designed to mate with the threads 21 on tubular portion 18. Near the top but below threads 24 on portion 23 are drilled, or otherwise formed, vent holes as at 25, for the purpose of admitting fresh air to, and releasing water vapor and carbon dioxide from a plant or flower inside connecting portion 9.

The tubular portion 23 is made of a transparent material such as Plexiglas, or the like, so that a plant or flower within, such as 27, FIGURE 2 (shown planted in a portion of soil 28) may be viewed from outside. The remainder of my invention, except for the strap, I propose to make from an opaque or translucent plastic material, although, obviously, other materials can be used. The strap I would prefer to make of leather.

Having now described the various elements of my invention, I will now describe the operation of said invention.

The cosmetic carrying section, composed of cosmetic carrying portion 6 and lid 7 may be used as a closed article carrier, alone, or in conjunction with the plant or flower carrying section, composed of base 8 and connecting portion 9. If the user desires to carry only the usual female necessities, then she places said necessities in portion 6, fits lid 7 down over portion 6 in covering relation thereto with the cut-outs 16 embracing the attached ends of strap 13, and this completes one usable form of her sectional handbag. Optionally, if desired, a user may make a decorative and useful addition to the last-mentioned form of her handbag by accomplishing the following steps: First, a dirt, sand, or cotton mass represented by numeral 28 is placed into the interior of the receptacle formed by base 8. Next, in said dirt or sand mass is planted a plant, or into said dirt, sand or cotton mass are inserted the stem ends of live or artificial flowers. When a live plant is planted in mass 28 the compacted fibers or particles of mass 28 adhere to the plant's roots to anchor the plant in the mass. When the stems of cut or artificial flowers are inserted into mass 28, the surface adhesion of mass 28 to the stems anchors the live or artificial flowers to the mass. If live plants or flowers are employed, then water must be added occasionally to said dirt, sand or cotton to maintain plant or flower life and longevity of enjoyment. After filling the base 8 as described, the user would thread the connecting portion 9 upstandingly thereon as seen in section in FIGURE 2. This combination of base 8, flower or plant, and connecting portion 9 may obviously be used alone as a decorative floral or plant display wherever desired, but said combination is specifically designed for depending engagement from cosmetic carrying portion 6 which is accomplished by engaging the mating threads 24 and 12. After such engagement it is apparent that the flowers or plant are enclosed in a protective casing, and said flowers or plants may be transported to and displayed and enjoyed wherever a user may desire.

The vent holes 25 allow air to circulate freely around the confined vegetation, as aforementioned. The finger entry recesses 22 accommodate a user's finger tips so that base 8 may be disengaged easily from connecting portion 9. Obviously base 8 with its vegetation may be removed from the remaining portions and used alone if desired.

It is contemplated that my invention would be especially popular with stenographers, secretaries, or the like, who often carry plants are flowers to work with them, and also with women faced with the problem of transporting a corsage to or from a dance or other similar dress occasion. In the case of secretaries, by using my invention they could display and enjoy their plants or flowers at home by using only base 8, or base 8 and connecting portion 9 together as a container, and then they could carry said plants or flowers to or from their places of employment in a protected and efficient manner by assembling parts 6, 7, 8 and 9 as seen in FIGURE 2. After reaching office or home they could then either leave all of the last-enumerated parts assembled, or they could remove 6 and 7 from 8 and 9 thereby providing themselves with both a cosmetic carrying section and a decorative floral piece.

Having shown and described my invention, what I claim as new and desire to secure by Letters Patent is:

1. A sectional handbag comprising: a first substantially rigid supporting section having integral attaching means thereon; a second substantially rigid supporting section having integral attaching means thereon, said second section being spaced above said first section and adapted to form a roof over said first section; said first section including a bottom member and material confining means, said material-confining means including an endless wall-forming portion attached to and extending upwardly from said bottom member and flange-forming means rigidly attached to and extending inwardly from the top of said wall-forming portion so as to define an aperture; connecting means removably attaching said second section to said first section, said connecting means comprising a substantially rigid transparent tubular portion having opposite ends, one of said ends having thereon integral attaching means removably engaged with the integral attaching means on said first section, and the other of said ends having thereon integral attaching means removably engaged with the integral attaching means on said second section; an upper tubular portion attached at its lower end to said second section and extending upwardly from said second section; a handle having opposite ends attached at spaced locations to the upper tubular portion near the top thereof; and a removable lid closing the top of said upper tubular portion.

2. The combination of claim 1 wherein each of said attaching means comprises thread-forming means.

3. The combination of claim 1, said connecting means including vent-forming means for allowing air to circulate into and out of said connecting means.

4. The combination of claim 1, said lid including a horizontally extending top portion and an endless flange attached to and depending from the periphery of said top portion and surrounding the upper end of said upper tubular portion, said flange on said lid including spaced notches partially encompassing the opposite ends of said handle.

References Cited by the Examiner

UNITED STATES PATENTS

| | | | |
|---|---|---|---|
| 786,547 | 4/1905 | Chamberlin | 206—46 |
| 1,533,131 | 4/1925 | Muller | 150—35 |
| 2,160,998 | 6/1939 | Wilson | 206—46 |
| 2,176,955 | 10/1939 | Clow | 206—46 |
| 2,326,414 | 8/1943 | Thompson | 150—28 |
| 2,334,410 | 11/1943 | Hume | 150—28 |
| 2,451,274 | 10/1948 | Carder | 150—28 |
| 2,645,375 | 7/1953 | Topfer | 150—28 |
| 2,672,903 | 3/1954 | Machinist | 150—28 |
| 2,707,552 | 5/1955 | Matthiesen | 206—37 |
| 2,801,666 | 8/1957 | Steele | 150—34 |
| 2,875,801 | 3/1959 | Borfuss | 150—28 |
| 2,888,970 | 6/1959 | Seaver | 150—28 |
| 2,927,394 | 3/1960 | Johnson | 150—28 |
| 3,026,997 | 3/1960 | Bianchi et al. | 206—45.34 |

FOREIGN PATENTS

| | | |
|---|---|---|
| 744,483 | 1/1933 | France. |
| 1,139,419 | 2/1957 | France. |

GEORGE O. RALSTON, *Primary Examiner.*

FRANKLIN T. GARRETT, *Examiner.*